J. S. PENDLETON.
PACKING FOR PISTON RODS.
APPLICATION FILED OCT. 1, 1909.
963,645.
Patented July 5, 1910.
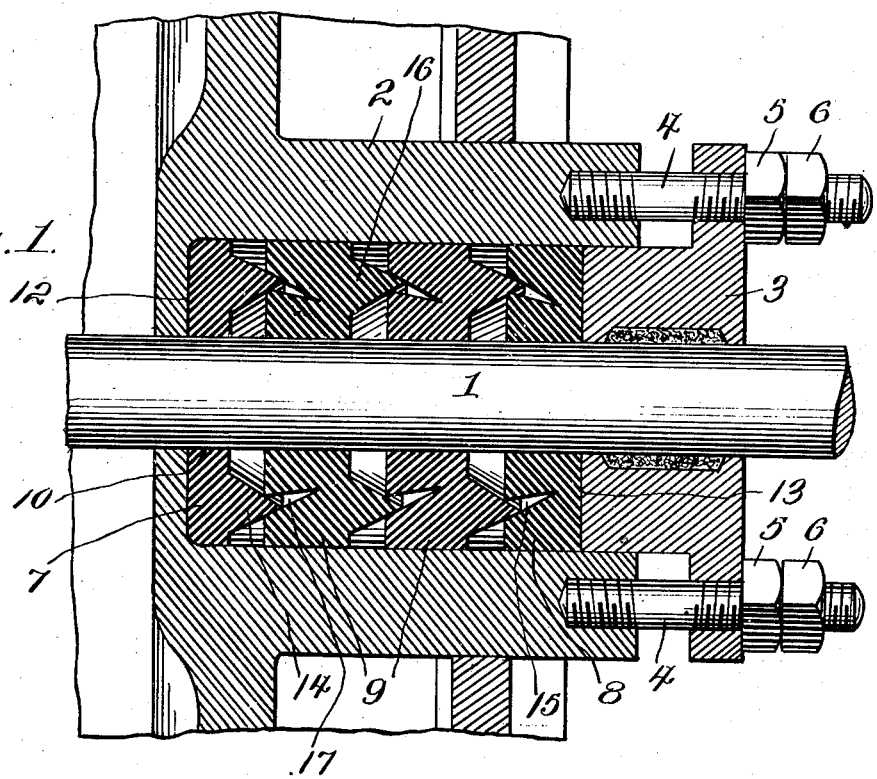
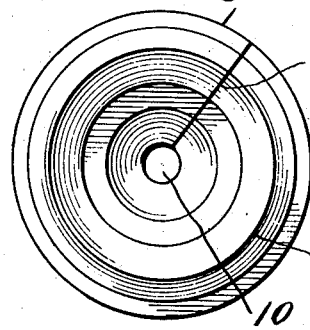
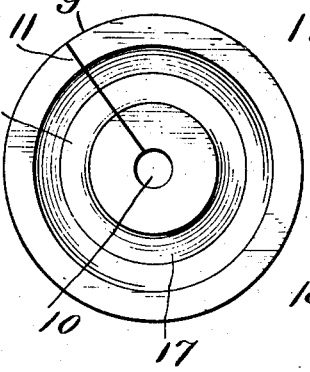
Witnesses
J. T. L. Wright
C. C. Hines
Inventor
John S. Pendleton,
By Victor J. Evans,
Attorney

UNITED STATES PATENT OFFICE.

JOHN S. PENDLETON, OF LINCOLN, ILLINOIS.

PACKING FOR PISTON-RODS.

963,645. Specification of Letters Patent. Patented July 5, 1910.

Application filed October 1, 1909. Serial No. 520,491.

*To all whom it may concern:*

Be it known that I, JOHN S. PENDLETON, a citizen of the United States, residing at Lincoln, in the county of Logan and State of Illinois, have invented new and useful Improvements in Packings for Piston-Rods, of which the following is a specification.

This invention relates to improvements in packings for piston rods and the like, the object of the invention being to provide packing rings of novel construction whereby the escape of steam or other fluid around the rod will be effectually prevented and a fluid tight joint at all times maintained, and further to provide packing rings of a type which will automatically adjust themselves to compensate for wear and which may be inexpensively manufactured.

The invention consists of the features of construction, combination and arrangement of parts hereinafter fully described and claimed, reference being had to the accompanying drawing, in which:—

Figure 1 is a longitudinal section through a stuffing box showing the application of the invention. Figs. 2 and 3 are opposite side views of one of the intermediate packing rings, showing the same in compressed condition. Fig. 4 is a cross sectional view of the same.

Referring to the drawing, 1 designates a piston or other like reciprocating rod, 2 a stuffing box through which the same extends, and 3 the gland or follower operating in the stuffing box and secured thereto by bolts 4 and securing and jam nuts 5 and 6, whereby the follower may be adjusted as occasion requires.

Arranged within the stuffing box is a series of packing rings, comprising inner and outer terminal rings 7 and 8 and one or more intermediate rings 9, each of which is composed of rubber or any suitable elastic composition of which rings of this character are customarily made, said rings being molded or otherwise made into form. Each ring is provided with a central opening 10 for the passage of the piston rod and has a radial slit 11 leading therefrom, whereby the ring is rendered expansible and contractible. The inner terminal ring 7 is provided with a flat inner abutting face 12 to bear against the inner end of the stuffing box while the outer terminal packing ring 8 is provided with a flat outer abutting face 13 to bear against the inner surface of the gland or follower 3. Irrespective of the number of intermediate packing rings 9 employed, the inner terminal ring 7 of the series is formed upon its inner face with an annular flange 14 which is tapered or wedge shaped on cross section, while the inner face of the outer terminal ring 8 is formed with a correspondingly shaped annular recess 15. Each intermediate packing ring is formed upon its outer face with a flange 16 similar to the flange 14 and in its inner face with a recess 17 similar to the recess 15. As shown in the present instance, the flange of the ring 7 fits within the recess 17 of the inner intermediate packing ring, while the flange 16 of said intermediate ring fits within the recess 17 of the outer intermediate packing ring, and the flange 16 of the last named ring fits within the recess 15 of the outer terminal packing ring, the peripheral surfaces of all of the rings contacting closely with the side wall of the stuffing box to maintain a steam tight connection therewith.

It will be understood from the foregoing description that the walls of the openings 10 of the respective packing rings closely engage the rod 1 to form a secure, tight joint to prevent leakage of steam or other fluid through the stuffing box, and that the material from which the rings are made permits them to expand under heat to which they are subjected to maintain a close fit under normal conditions against the surfaces of the rod and stuffing box, which action is promoted by the elasticity of the material. The openings 10 in the rings 8 and 9, of each ring provided with an annular recess, tapers toward the recessed face of the ring to provide an intervening flexible wall or portion 18, which, when the ring is fitted in position upon tie rod, will expand or be forced outwardly to make the opening of uniform diameter and partially close the annular recess, leaving it only sufficiently open to receive the extremity of the flange or projection of the coacting ring. The intermediate rings will accordingly snugly engage the rod to prevent the passage of any steam or other fluid which may find its way or leak past the ring 10, while at the same time the flexible portions 18 are adapted to be compressed by the tapered flanges against the surface of the rod to maintain a steam tight connection therewith.

Primarily, the rings are adjusted by means of the gland 3 to bear with the desired force against the wall of the box and surface of the rod to prevent leakage. As wear occurs upon the walls of the openings 10, the flexible portions 18 of the recessed rings are forced by their elasticity and the pressure of the engaging flanges 14 against the rod 1, whereby provision is made for automatically taking up any wear that may occur. When it is necessary to adjust the gland 3 inwardly to compensate for wear it will be understood that through the forcing of the rings together, the tapered flanges will be caused to enter the recesses to a greater extent and spread the walls thereof further apart, thus expanding the contact surfaces of the ring into engagement with the wall of the box and the surface of the rod.

It will thus be seen that my invention provides a simple construction and arrangement of packing rings by which an effective steam tight joint will be maintained and looseness from wear to a certain degree automatically compensated for, and that by a simple adjustment of the gland any excess wear may be readily and conveniently taken up. The material or composition of which the rings are made also enables them to be manufactured and sold at a comparatively low cost.

I claim:—

1. A radially slit packing ring comprising an elastic body having a central opening of annular flaring form, and provided in one of its faces with an annular flaring recess surrounding said opening, the portion of the ring between said opening and recess providing a normally conical flange adapted to be expanded to cylindrical form by the pressure of the piston rod.

2. A packing ring comprising a radially slit body of elastic material having a central opening of conical form at one side of said body, and provided in said side around said opening with an annular tapering recess, and upon its opposite side with an annular tapered projection, the portion of the body between the conical end of the opening and the recess providing a conical flange adapted to be expanded into cylindrical form by the piston rod, said flange being adapted to be compressed when expanded toward the rod by the tapered projection of a co-acting ring extending into said recess.

In testimony whereof I affix my signature in presence of two witnesses.

JOHN S. PENDLETON.

Witnesses:
JOHN D. CUNNINGHAM,
CLARENCE H. HORNER.